United States Patent

Schloss

[15] 3,666,835
[45] May 30, 1972

[54] POLYURETHANE SYSTEMS
[72] Inventor: Hans R. Schloss, Wallington, N.J.
[73] Assignee: Sun Chemical Corporation, New York, N.Y.
[22] Filed: Apr. 16, 1970
[21] Appl. No.: 29,306

[52] U.S. Cl. ......................260/858, 161/190, 260/77.5 AM
[51] Int. Cl. ....................................C08g 41/04, C08g 22/14
[58] Field of Search ..................260/77.5 AP, 77.5 AM, 858, 260/75 NK, 75 TN

[56] References Cited

UNITED STATES PATENTS

| | | | |
|---|---|---|---|
| 3,274,160 | 9/1966 | Elecgast et al. | 260/77.5 |
| 3,284,539 | 11/1966 | McElroy | 260/858 |
| 3,012,987 | 12/1961 | Ansul | 260/45.4 |
| 3,490,987 | 1/1970 | Bauriedel | 161/190 |
| 3,271,352 | 9/1966 | Weinberg | 260/37 |
| 3,094,495 | 6/1963 | Gemeinhardt | 260/2.5 |
| 3,496,045 | 2/1970 | Keberle et al. | 156/331 |
| 2,801,648 | 8/1957 | Anderson et al. | 138/74 |

Primary Examiner—Donald E. Czaja
Assistant Examiner—H. S. Cockeram
Attorney—Cynthia Berlow

[57] ABSTRACT

Solvent-free polyurethane systems particularly useful as textile laminating adhesives comprise a hydroxyl-terminated urethane prepolymer and an isocyanate-terminated urethane prepolymer.

9 Claims, No Drawings

POLYURETHANE SYSTEMS

This invention relates to novel polyhydroxy-terminated polyethers and to polyurethanes obtained therefrom. More specifically the invention relates to solvent-free polyurethane products and to the use of these products as textile laminating adhesives.

Fabric-to-fabric bonding is an important feature in the textile field, particularly in the area of clothing. It permits, for example, built-in linings in garments, more stable structures, greater wrinkle resistance, improved stretch and recovery, more attractive appearance, greater comfort, and hitherto unattainable surface effects. Polyurethanes are particularly desirable as adhesives for bonded fabrics because they have extraordinary chemical resistance, especially solvent resistance; abrasion resistance; laminating qualities; and handling properties.

There are, however, a number of major disadvantages to the use of known polyurethane adhesives. Cloth laminated with polyurethanes tends to yellow upon exposure to light; the materials which are to be bonded together have to be heated to high temperatures and maintained at these high temperatures in order to cure the adhesive and obtain a satisfactory bond; moreover, such adhesives are usually applied as a solution in a solvent, generally a highly flammable and often toxic solvent.

It has now been found that these difficulties can be overcome by the solvent-free system of the present invention which comprises two prepolymers, namely a hydroxyl-terminated urethane prepolymer (A) and an isocyanate-terminated urethane prepolymer (B). Prepolymer A is in general the product of the stepwise reaction of (a) an alkylene oxide-based polyol capped on both ends with ethylene oxide with (b) an isocyanate and (c) a glycol in the presence or absence of (d) a polyol having a functionality of at least 3 and/or (e) a catalyst. Prepolymer B is formed by reacting (f) a straight chain glycol or polyol with (g) a polyol having a functionality of at least 3 and (h) an isocyanate in the presence or absence of a catalyst.

PREPOLYMER A

The polyols (a) are prepared by adding an alkylene oxide to the two hydroxyl groups of an alkylene glycol nucleus. The resulting water-insoluble base can be made to any controlled length ranging in molecular weight from about 800 up to several thousand. For the purpose of this invention, the molecular weight is generally within the range of about 950 to 3,000, and preferably about 1,400 to 2,400. Ethylene oxide is then added to this hydrophobic base to put water-soluble polyoxyethylene groups onto the ends of the molecule. The resulting condensates, such as polyoxyethylene-polyoxypropylene glycol, are obtainable commercially, e.g., Pluronics sold by Wyandotte Chemicals Corp. and Niax Polyol LC sold by Union Carbide Corporation.

The condensate is then reacted with an excess of any aliphatic, aromatic, or cycloaliphatic compound of the general formula $R(NCX)_{n+1}$ in which R is a polyvalent organic radical, X is oxygen or sulfur, and $n$ is any integer except zero, provided that any such compound contains no substituent which will interfere with the reaction. Examples of isocyanates and isothiocyanates are polymethylene diisocyanates and diisothiocyanates, such as ethylene diisocyanate, trimethylene diisocyanate, tetramethylene diisocyanate and pentamethylene diisocyanate; and the corresponding diisothiocyanates, alkylene diisocyanates and diisothiocyanates, such as propylene-1,2-diisocyanate, butylene-1,2-diisocyanate, butylene-1,3-diisocyanate, butylene-2,3-diisocyanate, and butylene-1,3-diisothiocyanate; alkylidene diisocyanate and diisothiocyanates, such as ethylidene diisocyanate, butylidene diisocyanate and ethylidene diisothiocyanate; cycloalkylene diisocyanates and diisothiocyanates, such as cyclopentylene-1,3-diisocyanate, cyclohexylene-1,4-diisocyanate and cyclohexylene-1,2-diisothiocyanate; cycloalkylidene diisocyanates and diisothiocyanates, such as cyclopentylidene diisocyanate, cyclohexylidene diisocyanate and cyclohexylidene diisothiocyanate; aromatic diisocyanates and diisothiocyanates, such as metaphenylene diisocyanate, paraphenylene diisocyanate, 1-methyl-2,4-phenylene diisocyanate, naphthylene-1,4-diisocyanate, diphenylene-4,4'-diisocyanate or p-phenylene diisothiocyanate; aliphatic-aromatic diisocyanates or diisothiocyanates, such as xylylene-1,4-diioscyanate, xylylene-1,3-diisocyanate, 4,4'-diphenylenemethane diisocyanate, 4,4'-diphenylene-propane diisocyanate, xylylene-1,4-diisothiocyanate or durene diisocyanate. Aromatic diisocyanates, for example, a tolylene diisocyanate or isomeric mixtures thereof, are preferred.

The resulting NCO - terminated compound is further reacted with any suitable glycol in order to build up the polymer and to give it hydroxyl termination, thus increasing the dry-cleaning resistance and the water-solubility of the product. Sufficient diisocyanate should be used in making the NCO - terminated compound so that the ratio of NCO groups to the total OH groups provided by the condensate and the glycol will be about 0.88–0.97. In general the addition of the glycol enables one to tailor the polymer to effect the desired physical properties for the final end use; for example, with ethylene glycol the product is stiff, hard, and brittle; with tetraethylene glycol the product is softer and more flexible. Furthermore, the addition of short chain glycols multiplies the number of urethane linkages, thus increasing the number of polar groups per molecule. In this manner functional groups can be added that will affect the water solubility or insolubility of the product, its resistance to dry cleaning, its flame resistance or fireproofing qualities, and the like.

Such glycols as ethylene glycol, diethylene glycol, triethylene glycol, tetraethylene glycol, 1,2-propylene glycol, 1,3-propylene glycol, tripropylene glycol, tetrapropylene glycol, 1,3-butanediol, 1,4-butanediol, 1,6-hexanediol, thiodiglycol, and the like, and mixtures thereof have been found suitable. The amount of glycol may range up to about 8.0 equivalents per equivalent of the condensate, and preferably about 1.5 to 2.5 equivalents.

If desired, this OH-terminated product may further be reacted with a polyol which has a functionality greater than two. The polymer molecule should have long portions or sections of chain with no intermolecular forces or crosslinks for elasticity (a); the introduction of urethane linkages in portions of the chain increases moisture- and solvent-resistance and increases intermolecular forces to effect higher modulus, tear strength, hardness, melting point, and glass transition temperatures (b); the crosslink points (c) hold the chains together for solvent- and moisture-resistance, as illustrated below:

| (a) | (b) | (c) | (a) | (b) | (c) | (a) |
|---|---|---|---|---|---|---|
| (a) | (b) | (c) | (a) | (b) | (c) | (a) |
| (a) | (b) | (c) | (a) | (b) | (c) | (a) |

The polyol may be any suitable polyhydric alcohol having about 3 to 6 hydroxyl groups and a molecular weight less than 500, provided that it does not contain any tertiary N atoms. Suitable compounds include, but are not limited to, glycerine, trimethylolpropane, triethylolpropane, pentaerythritol, 1,2,4-butanetriol, 1,2,5-pentatriol, 1,2,6-hexanetriol, sucrose, sorbitol and the like, and mixtures thereof. A polyhydric alcohol having hetero oxygen or sulfur atoms in the chain may also be used. The amount of polyol employed may range from about 0.05 to 1 equivalent, preferably about 0.15 to 0.35, per equivalent of the condensate.

The resulting hydroxyl-terminated prepolymer is characterized by being a clear liquid, water white to light amber in color, having a low viscosity and a molecular weight within the range of about 3,500 to 60,000.

Although a catalyst is not required in the preparation of Prepolymer A, the use of such a compound may be desired to accelerate the reaction. Particularly suitable are the amines, such as tetramethylbutane diamine, triethylamine, diethylcyclohexylamine, dimethyldodecylamine, dimethyloctadecylamine, dimethylstearylamine, N-ethylmorpholine, triethylene diamine, tripropylamine, tributylamine, triamylamine, tribenzylamine, dimethylaniline, tetraethylene diamine, and the like, and mixtures thereof. The amines may be employed in an amount ranging from about 0.05 to 2.0 per cent by weight, based on the total weight of the hydroxyl-terminated compound.

Other suitable catalysts are the organometallic compounds, such as for example dibutyltin diacetate, dibutyltin dilaurate, dibutyltin di-2-ethylhexoate, stannous octoate, stannous oleate, stannous 2-ethylhexoate, and the like, and mixtures of these. In general these are used in an amount ranging from about 0.005 to 0.03, preferably 0.01 to 0.02, weight per cent, based on the total weight of the composition.

Although the method of preparing Prepolymer A is not critical, it is preferred to react the condensate with the isocyanate compound before reacting it with the glycol and the polyol. When the ratio of NCO groups to OH groups is about 1, the compound tends to form a gel. To reduce to a minimum the conditions favoring the gel, it is preferred to go from an excess of NCO groups to an excess of OH groups, thus passing only once the critical point where they are equal, than to go from an excess of OH groups to an excess of NCO groups and back to the required excess of OH groups, passing twice the point at which the two are equal and extra care must be taken.

The reaction should be carried out under substantially anhydrous conditions, i.e., the reaction mixture should not contain more than about 0.05 to about 0.5 part of water per 100 parts of the mixture, and preferably the mixture should contain less than 0.1 part of water per 100 parts of the mixture.

The reaction normally takes place at room temperature but may be accelerated by heating the reactants to about 40° to 150° C. Any suitable apparatus may be used for mixing the ingredients together.

PREPOLYMER B

The NCO-terminated prepolymer is prepared by reacting (f) a straight chain glycol with (g) a polyol having a functionality of at least 3 and (h) an isocyanate in the presence or absence of a catalyst. The glycol (f) preferably has a molecular weight between about 62 and 800 and may be any suitable glycol such as one of the glycols set forth above. The isocyanate may be any suitable aliphatic, aromatic, or cycloaliphatic compound having the general formula $R(NCX)_{n+1}$ as defined above. The polyol (g) and the catalyst, if desired, likewise may be one of those set forth above. The ratio of the reactants may range from about 3 to 6 parts of the glycol: 20 to 60 parts of isocyanate: 4 to 40 parts of polyol (g), and preferably 3 to 5: 40 to 60: 10 to 15. The resulting prepolymer is characterized by low viscosity and has a molecular weight in the range of about 300 to 1,600.

In general practice the two prepolymers are inter-reacted in the absence of a solvent in an amount ranging from about 10 to about 60 parts of Prepolymer B per 100 parts of Prepolymer A. Prepolymers A and B are combined by any known and convenient means, e.g., by stirring or shaking. The resulting system is applied to the substrate or substrates by any conventional coating technique.

The polyurethane resin systems prepared in the above-described manner have many unexpected properties which are superior to those of conventional polyurethane products for many applications. The compounds of this invention are particularly suitable as adhesives for fabric-to-fabric bonding, such as cotton, rayon, wool, nylon, polyester, acrylic, polyamide, polyurethane, polyolefin, metallized fabrics, and the like, and blends thereof, where the two bonded fabrics may be the same or different. They are also useful for laminating plastic film to plastic film or other substrates; in fabric coating; in paper coating; and the like. The new polyurethanes are completely non-yellowing. They cure below 100° F., rather than at the conventional curing temperature of about 120° to 180° F., and can be applied as 100 percent solids. The absence of a solvent means that employing the materials of this invention in a laminating process eliminates the need for ventilation and for special explosion-proof equipment; there is no odor and no problem of air pollution. In addition, the polyurethanes of this invention are more resistant than conventional fabric bonding adhesives to dry cleaning, washing, and abrasion. They are easily applied to a variety of substrates and can be tailor-made to suit any desired application.

The invention is further illustrated but not limited by the following examples in which parts are given by weight unless otherwise specified.

EXAMPLE 1

A. A hydroxyl-terminated prepolymer was prepared by charging into a reaction vessel equipped with a stirrer and heating means 1,100 parts of a polyoxyethylene-polyoxypropylene condensate obtained by adding ethylene oxide to both ends of a block polymer prepared by adding propylene oxide to propylene glycol, having a molecular weight of about 2,000 and containing 40 per cent of ethylene oxide; 300 parts of 2,4-tolylene diisocyanate; and 0.3 part of tetramethylbutane diamine. The mixture was agitated for about 45 minutes at 120° F. 240 parts of tetraethylene glycol was then added and the agitation continued for 45 minutes. The resulting prepolymer was a light amber liquid having a viscosity of Z-4.

B. An isocyanate-terminated prepolymer was prepared by charging into a reaction vessel equipped with a stirrer and a heating means 130 parts of 1,3-butylene glycol, 1,950 parts of 2,4-tolylene diisocyanate, and 400 parts of trimethylolpropane. The mixture was agitated for 480 minutes at 170° F. The resulting prepolymer was a light amber liquid having a low viscosity.

C. 100 parts of Prepolymer A and 20 parts of Prepolymer B were mixed, and the resulting compound was used to laminate cotton to acetate at room temperature.

EXAMPLE 2

The procedure of Example 1A was repeated except that the formulation also included 33 parts of trimethylolpropane. The product was a clear liquid having a medium viscosity.

100 parts of this prepolymer were mixed with 40 parts of the prepolymer of Example 1B and used to bond cotton to acetate tricot.

EXAMPLE 3

The procedure of Example 2 was repeated except that the condensate was 980 parts of a 50/50 mixture of the polyoxypropylene-polyoxyethylene polyols containing, respectively, 20 percent of ethylene oxide and 40 percent of ethylene oxide; the amount of tetraethylene glycol was 240 parts; and the amount of trimethylolpropane 9 parts. The product was a clear liquid having a medium viscosity.

EXAMPLE 4

The procedure of Example 2 was repeated except that the condensate was 900 parts of a 50/50 mixture of the polyols containing, respectively, 20 percent of ethylene oxide and 30 percent of ethylene oxide; the amount of tetraethylene glycol was 190 parts; and the amount of trimethylolpropane was 9 parts. The product was a clear liquid having a medium viscosity.

EXAMPLE 5

A. The procedure of Example 2 was repeated except that the condensate was 1,750 parts of a 40/40/20 mixture of polyols containing, respectively, 20 percent, 30 percent, and 40 percent of ethylene oxide; the amount of tetraethylene glycol was 360 parts; and the amount of trimethylolpropane was 12 parts. The resulting prepolymer was a clear liquid having a medium viscosity.

B. An NCO-terminated prepolymer was prepared by the process of Example 1B except that the formulation was 75 parts of butylene glycol, 450 parts of trimethylolpropane, 2,020 parts of tolylene diisocyanate, and 850 parts of ethyl acetate. The resulting prepolymer was a slightly amber liquid having a low viscosity.

C. 100 parts of Prepolymer A and 10 parts of Prepolymer B were mixed and used to laminate cotton to acetate tricot.

EXAMPLE 6

The procedures of Examples 1A and 2 were repeated except that the glycol was 1,3-butylene glycol. The products were comparable.

EXAMPLE 7

The procedure of Example 1A was repeated except that the glycol was dipropylene glycol. The product was comparable.

EXAMPLE 8

The procedure of Example 1A was repeated except that the glycol was a 50/50 mixture of tetraethylene glycol and dipropylene glycol. The product was comparable.

EXAMPLE 9

The procedure of Example 1A was repeated except that the glycol was tripropylene glycol. The product was comparable.

EXAMPLE 10

The procedures of Examples 1A and 2 were repeated except that the glycol was 1,6-hexanediol. The products were comparable.

EXAMPLE 11

The procedure of Examples 1A and 2 were repeated except that the glycol was diethylene glycol. The products were comparable.

EXAMPLE 12

The procedures of Examples 1A, 2, and 3-11 were repeated with each of the following isocyanates instead of tolylene diisocyanate: xylylene diisocyanate, hexamethylene diisocyanate, an aliphatic diisocyanate derived from the diamine of a dimer acid (DDI diisocyanate), and p,p'-diphenyl methane diisocyanate. The products were comparable.

EXAMPLE 13

The procedure of Example 2 was repeated with each of the following cross-linking compounds instead of trimethylolpropane: triethylolpropane, pentaerythritol, 1,2,4-butanetriol, sorbitol, and glycerine. The products were comparable, except that they had higher viscosities.

EXAMPLE 14

The procedure of Example 1A was repeated with each of the following catalysts instead of tetramethylbutane diamine: triethylamine, dimethylstearylamine, dibutyltin dilaurate, dibutyltin diacetate, stannous octoate, and stannous oleate. The results were comparable.

EXAMPLE 15

The procedure of Example 1C was repeated except that the following pairs were bonded to each other instead of cotton to acetate: cotton/cotton, cotton/nylon, acetate/acetate, wool/acetate, wool/nylon, nylon/acetate, and acrylic fabric/acetate. The results were comparable.

EXAMPLE 16

The wash resistance of laminates was determined by the following procedure: Strips (1 ×3 inches) were washed 5 times at 30 minutes each in soapy water at 140° F. The peel strength was measured on the wet strips.

The dry cleaning resistance of laminates was determined by the following procedure: Strips (1 ×3 inches) were subjected to five 30-minute dry cleaning cycles in cleaning solution which consisted of a standard soapy perchloroethylene solution. The peel strength of each laminate was measured wet.

The results of the tests are expressed in peel strength, the pounds per inch required to peel apart one lamina from another across a 1-inch width by means of an Instron tester. In each of the following tests the OH-terminated prepolymer was mixed with the NCO-terminated prepolymer, and the product was applied to materials as described in Example 1C.

TABLE

| Product of example | | | Coating level, ounces/ square yard | Peel Strength, pounds per inch | | |
|---|---|---|---|---|---|---|
| OH-terminated prepolymer A | NCO-terminated prepolymer B | A, B/100 | | As applied (dry) | After 5 automatic home launderings (wet) | After 5 dry cleanings (wet) |
| Control* | | | | 0.39 | 1.12 | 0.28 | 0.35 |
| 2 | 1B | 30 | 0.40 | 1.85 | 0.30 | 0.53 |
| 2 | 1B | 30 | 0.90 | 2.47 | 0.34 | 0.68 |
| 4 | 1B | 10 | 0.42 | 1.55 | 0.44 | 0.36 |
| 5A | 1B | 20 | 0.39 | 1.67 | 0.38 | 0.40 |
| 5A | 5B | 20 | 0.52 | 1.60 | 0.46 | 0.56 |

*Control = a conventional polyester-type polyurethane adhesive (Sdln Chemical Corporation's Warcoflex 219).

As can be seen above, the products of this invention had better resistance to washing and to dry cleaning, as indicated by higher peel strengths, than did the control.

In all cases the systems prepared with the polyether polyurethane prepolymers of this invention were much whiter than that using the conventional polyester polyurethane adhesive and resulted in laminates that had superior overall properties with the additional advantages of being able to apply the adhesive as 100 percent solids at room temperature.

EXAMPLE 17

A polyether-based urethane system consisting of 20 parts of the NCO-terminated prepolymer of Example 5B and 100 parts of the OH-terminated prepolymer of Example 2 was used in an amount of 0.04 ounce/square yard to coat paper. The product was a smooth clear coating.

EXAMPLE 18

The procedure of Example 17 was repeated except that the substrates were 2- to 4- mil nylon, Mylar, and vinyl chloride films. The products were smooth clear coatings.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A solvent-free polyurethane composition comprising the reaction product of a hydroxyl-terminated prepolymer (A) having a molecular weight of about 3,500 to 60,000 and an isocyanate-terminated prepolymer (B) having a molecular weight of about 300 to 1,600 wherein (A) is the product of the stepwise reaction of (a) a polyoxyethylene - polyoxyalkylene glycol condensate with (b) an organic polyisocyanate and (c) a glycol and (B) is the reaction product of (f) a glycol having a molecular weight of about 62 to 800 with (g) a polyol having a functionality of at least 3 and (h) an organic polyisocyanate.

2. The polyurethane composition of claim 1 wherein the ratio of prepolymer (B) to prepolymer (A) is about 10 to 60 parts of (B) to 100 parts of (A).

3. The composition of claim 1 wherein the prepolymer (A) is further reacted with (d) a polyol having a functionality of at least 3.

4. The polyurethane composition of claim 3 wherein the prepolymer (A) contains up to about 8 equivalents of glycol (c) and about 0.05 to 1 equivalent of polyol (d) per equivalent of polyol (a) and sufficient isocyanate (b) to give final NCO/OH ratio of about 0.88–0.97 and the prepolymer (B) contains about 3–6 parts of glycol (f), 4–40 parts of polyol (g), and 20–60 parts of isocyanate (h).

5. The polyurethane composition of claim 3 wherein the prepolymer (A) contains about 1.5–2.5 equivalents of glycol (c) and about 0.15–0.35 equivalent of polyol (d) per equivalent of polyol (a) and the prepolymer (B) contains about 3–5 parts of glycol (f), 10–15 parts of polyol (g), and 40–60 parts of isocyanate (h).

6. The polyurethane composition of claim 3 wherein the isocyanate (b and h) is 2,4-tolylene diisocyanate, the glycol (c) is tetraethylene glycol, the polyol (d and g) is trimethylolpropane, and the glycol (f) is 1,3-butylene glycol.

7. An adhesive comprising the polyurethane composition of claim 1.

8. A coating composition comprising the polyurethane composition of claim 1.

9. The composition of claim 1 which additionally contains a catalyst.

* * * * *